(12) United States Patent
Selva

(10) Patent No.: US 8,515,122 B2
(45) Date of Patent: Aug. 20, 2013

(54) UNIVOCAL LABEL TO BE STORED BY OPTICAL DEVICES, METHOD OF PRODUCTION OF THE SAME AND USE THEREOF IN THE ANTICOUNTERFEITING AND IN THE IDENTIFICATION OF PRODUCTS

(76) Inventor: Claudio Selva, Biella Pavignano (IT)

( * ) Notice: Subject to any disclaimer, the term of this patent is extended or adjusted under 35 U.S.C. 154(b) by 349 days.

(21) Appl. No.: 13/001,122

(22) PCT Filed: Jan. 14, 2009

(86) PCT No.: PCT/IB2009/000062
§ 371 (c)(1),
(2), (4) Date: Dec. 23, 2010

(87) PCT Pub. No.: WO2010/001203
PCT Pub. Date: Jan. 7, 2010

(65) Prior Publication Data
US 2011/0183710 A1    Jul. 28, 2011

(30) Foreign Application Priority Data

Jul. 4, 2008 (IT) ................ BI2008A0010
Aug. 13, 2008 (IT) ................ BI2008A0015

(51) Int. Cl.
*G06K 9/00* (2006.01)
(52) U.S. Cl.
USPC ........................................ 382/100
(58) Field of Classification Search
USPC .................. 382/100; 455/556.1; 383/74
See application file for complete search history.

(56) References Cited

U.S. PATENT DOCUMENTS

| | | | |
|---|---|---|---|
| 4,390,452 A * | 6/1983 | Stevens ................ | 252/408.1 |
| 7,038,766 B2 | 5/2006 | Kerns et al. | |
| 7,055,691 B2 | 6/2006 | Safian | |
| 2001/0041214 A1 | 11/2001 | Brogger et al. | |
| 2003/0136837 A1 * | 7/2003 | Amon et al. ................ | 235/435 |

* cited by examiner

*Primary Examiner* — Atiba O Fitzpatrick
(74) *Attorney, Agent, or Firm* — David A. Guerra

(57) ABSTRACT

Described herein are: a univocal label that can be applied to any product, which can be characterized by a logo or else the sign of the manufacturer and/or vendor, which can be detected and acquired with image-acquisition devices and in particular with any photographic camera of a mobile-telephone apparatus; a method for production of said univocal label; as well as its use in anti-counterfeiting and in identification of products.

14 Claims, 3 Drawing Sheets

UNIVOCAL LABEL TO BE STORED BY OPTICAL DEVICES, METHOD OF PRODUCTION OF THE SAME AND USE THEREOF IN THE ANTICOUNTERFEITING AND IN THE IDENTIFICATION OF PRODUCTS

CROSS-REFERENCE TO RELATED APPLICATIONS

This application is an U.S. national phase application under 35 U.S.C. §371 based upon co-pending International Application No. PCT/IB2009/000062 filed on Jan. 14, 2009. Additionally, this U.S. national phase application claims the benefit of priority of co-pending International Application No. PCT/IB2009/000062 filed on Jan. 14, 2009, Italy Application No. BI2008A000010 filed on Jul. 4, 2008, and Italy Application No. BI2008A000015 filed on Aug. 13, 2008. The entire disclosures of the prior applications are incorporated herein by reference. The international application was published on Jan. 7, 2010 under Publication No. WO 2010/001203.

The present invention relates to the sector regarding means for product identification and war against counterfeiting, and concerns more precisely a unique label with evident signs that can be detected by an optical image-acquisition device, which can be applied to a product that is to be marked with a logo or else with any sign characterizing the manufacturer and/or vendor, the method of production thereof, and its use in anti-counterfeiting and in identification of products.

According to the present invention, the unique label is constituted by a suitable sheet made of transparent material having a thickness of approximately 0.25-200 μm, applied by gluing on which are, in a random and non-repeatable way, prints and/or holographs of logos or characterizing signs, which are to constitute, for each label, a unique map, which can be detected with reading and image-acquisition optical devices. Said map can be filed in a centralized control data bank to which the user can at any moment gain access to verify the originality and authenticity of the product purchased.

For said purpose, according to another aspect of the invention, the unique label, once applied on the product, is designed to be photographed in variable conditions of framing, lighting, and resolution, in the checking stage, via a remote system (for example, an appropriate optical device or a simple mobile-telephone apparatus equipped with photographic camera or digital telecamera) and processed with image-processing algorithms to bring it back as much as possible to the optimal conditions photographed by the master system.

The algorithms used in the present invention comprise, for example, filtering, image erosion, scaling of the grey levels, focussing, and warping.

From the image thus enhanced the co-ordinates and dimension of each particle are extracted. The data thus obtained are compared with the ones stored in the database through a merit function, which supplies positive factors for each coinciding point and negative factors for each point that is not recognized.

An acceptance threshold, which can be set according to the degree of reliability of recognition, determines whether the label is to be considered original or false.

STATE OF THE ART

In recent times, on account of global production and marketing of the products and of the intercontinental flow of persons, there has been encountered an exponential increase in phenomena of counterfeiting and colourable imitation both of the products themselves and of most famous trademarks, and, in some specific cases such as the foodstuff or pharmaceutical sectors, to the prejudice to the health of the consumer. Consequently, a large number of new-generation anti-counterfeiting and identification systems have been developed, such as, for example, magnetic labels, three-dimensional holographs, and safety inks. These systems have been obtained with highly innovative tools but are vulnerable and can be circumvented on account of their possible duplication, interception, or formulation, given that they are mainly mass-produced industrial products, which can be copied or identified with appropriate equipment.

PURPOSE OF THE INVENTION

The task of the present invention is to provide a unique label, which can be obtained at an extremely low cost and which will be able to characterize any product on which it is applied or made to adhere, thanks to the presence of a non-repeatable identifier map (substantially similar to a fingerprint), constituted by a plurality of logos or else distinctive signs, or parts thereof, randomly distributed, said map being designed to be read by an optical image-acquisition device, to be stored in a centralized control data bank, and to be subsequently detected with a suitable optical detection device, such as, for example, a digital photographic camera, in any place and at any moment for checking the property, for total guarantee of originality.

The above has been obtained according to the invention, by printing or holographing a logo or else a sign on a sheet made of suitable material, such as, for example, polyester. Said sheet has preferably a thickness of approximately 2 to 0.25 μm.

By means of drinking of the print and/or the holograph thus obtained, particles are obtained, which can be distributed, in a single-layer or by sprinkling, on the adhesive side of a sheet made of suitable transparent material, such as, for example, PVC, polypropylene, or polyvinyl of a thickness preferably of approximately 0.25 to 200 μm.

The sheet can also be spread previously on one face with a mixture containing said particles in an amount that can range approximately from 4% to 70% in a suitable glue, such as, for example, an acrylic glue even in aqueous solution commonly used for rendering a label adhesive.

The label thus obtained, leaves in transparent view, on the side not treated with the glue, the random distribution of the particles, which constitutes a background map and is a fingerprint proper which is univocal and non-repeatable, given that it is impossible to reconstruct an impression that is the same as the one filed since this has been previously obtained in an altogether random way.

The label forming the subject of the present invention is hence an optimal solution in defence of a product and is not only surprisingly simple, inexpensive, and applicable on any type of industrial production line, but can be also easily detected by the end user himself even with a simple mobile-telephone apparatus provided with photographic camera.

Consequently forming a first subject of the present invention is a label made up of at least one sheet of suitable transparent material, present, distributed, and randomly oriented on which are holographic or printed particles that are dinked in different sizes ranging from 10 to 4000 μm so as to enable their detection with an optical image-acquisition device during production or packaging and be filed in a central data bank.

Also forming a subject of the invention is a method for the production of the label described above, which consists in the following steps:

printing and/or holographing on a suitable sheet of material of a thickness of approximately 2-25 μm logos or characterizing signs having a maximum size of approximately 10-3000 μm in repetitive series;

dinking each print and/or holograph thus obtained in order to obtain particles that can be distributed on a suitable sheet of transparent material for labels having a thickness of approximately 0.25-200 μm, possibly pre-treated with a suitable glue or else spread with a mixture containing approximately 4-70% of said particles in a suitable glue; said particles can possibly also be sprayed on the glue with an industrial aerograph or laid on the PVC-, polyvinyl-, or polypropylene-based sheet to form the substrate of the transparent label;

printing on the back a sign in order to circumscribe the particles applied on the sheet of material for labels, in a space of approximately 0.50-2.5 cm² thus creating a map or "fingerprint" with unique background pattern;

reading, using a reading master system, the background map of the label, storing its characteristics of univocality in a compact format; the background map is optically detected with a high-resolution digital telecamera which frames it geometrically, illuminating it in a pre-set way and extracts co-ordinates and dimensions of each particle; and associating the data to a unique code read (datamatrix or other code) and storing them in a database for subsequent verification.

According to a further aspect of the present invention, said adhesive or non-adhesive label can be used as a safety label with a logo or else an intrinsic unique sign (map or "fingerprint"), which can be filed right from the start for a possible comparison of authenticity. There is envisaged in fact use, in anti-counterfeiting and in product identification, of a unique label according to the present invention, according to the following modalities:

detecting the map of the label applied to the product via an optical detection device; and analysing and/or filing said map in the central filing data bank, which can be either local or remote, so as to verify and check via optical means the originality of the product on which the label is applied.

This occurs according to the present invention by accessing in a known way the data bank mentioned above and comparing the detected image of the label with the corresponding one previously stored in said data bank during the process of production of the label of the present invention.

DETAILED DESCRIPTION OF THE INVENTION

Further characteristics and advantages of the present invention will emerge clearly from the ensuing detailed description with reference to the attached plates of drawing which illustrate, purely by way of non-limiting example, some preferred embodiments thereof.

Figure 3:
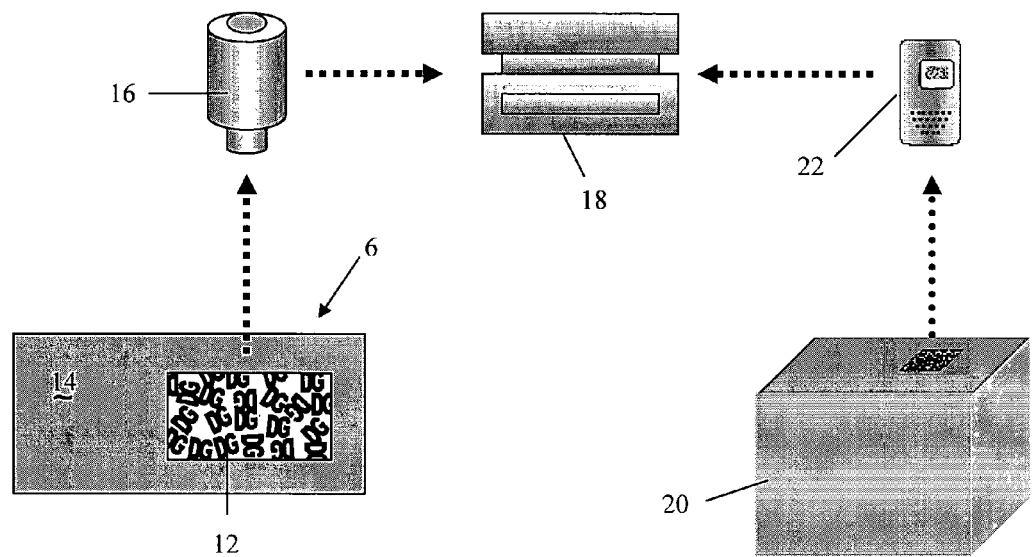
Figure 4:
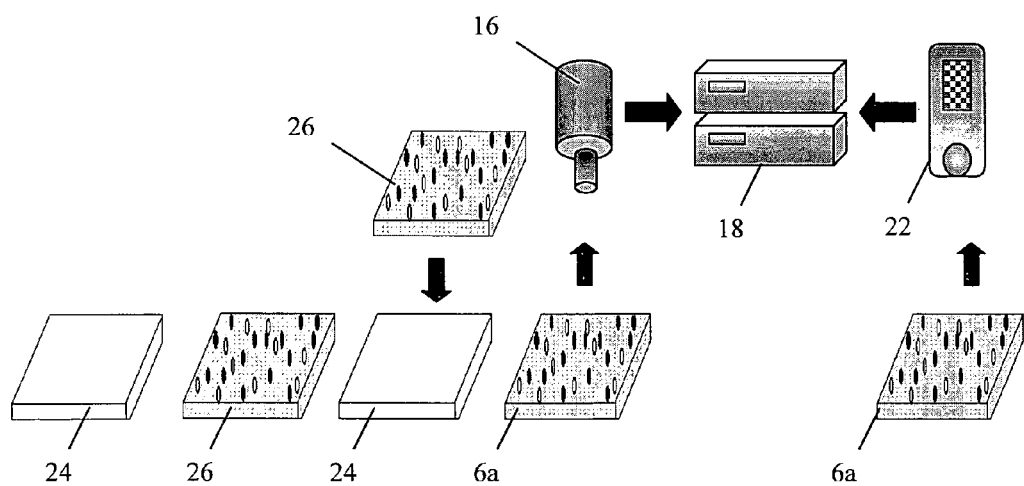

FIG. 3 is a schematic illustration of the step of storing of the label in the data bank and the subsequent remote detection using an optical device; and FIG. 4 is a schematic illustration of the steps of preparation and use of a label according to the invention according to a different method of embodiment that envisages coupling of a transparent PVC sheet with a bi-adhesive polyvinyl sheet on a face of which an acrylic glue is spread containing particles in the form of logos, signs, or letters obtained from a black polyester sheet or holographed.

With reference to the figures, in order to produce, for example, a polypropylene label characterized by a customer logo bearing a unique sign for a future check of originality as illustrated in FIG. 3 by the reference number 6, it is envisaged in the first place to provide a multiplicity of particles with the logo or with a particular personal sign chosen by the manufacturer as distinctive mark as well as sign for recognition of a given firm.

Figure 1A:
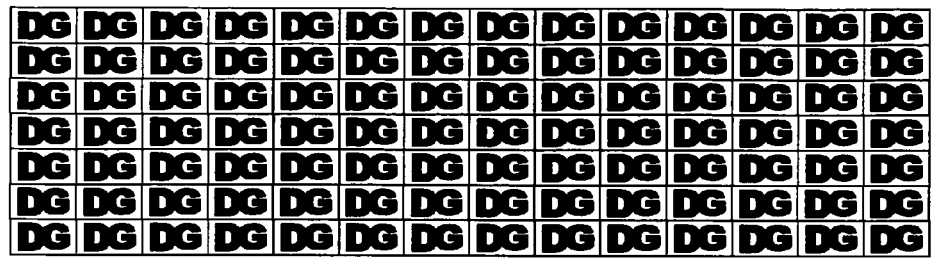
FIG. 1A shows a repetitive aligned series of a logo or sign to be used.

In order to achieve said result, on a sheet of plastic material or paper, whether neuter or coloured, with a thickness ranging approximately from 2 to 30 μm, an aligned series is printed and then dinked with the logo or distinctive sign of the manufacturer in a repetitive position and with a size of approximately 10-4000 μm (FIG. 1A).

Figure 1B:
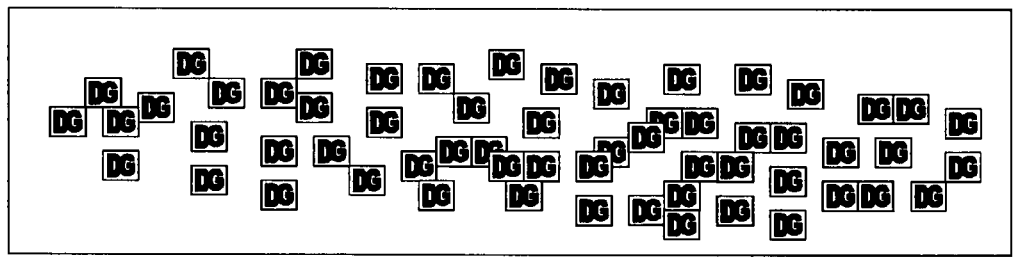
FIG. 1B shows a series of individual particles obtained by dinking, using the "edge-sign" method, of each single' logo or sign or according to a programmed cut.

This dinking is performed with the "edge-sign" method for each individual logo or sign, or according to a programmed and circumscribed cut thereof, creating an innumerable series of individual particles, with a size that can vary according to the print, each of which is characterized by the evident presence of the logo or sign as well as by its colour (FIG. 1B).

Figure 1C:
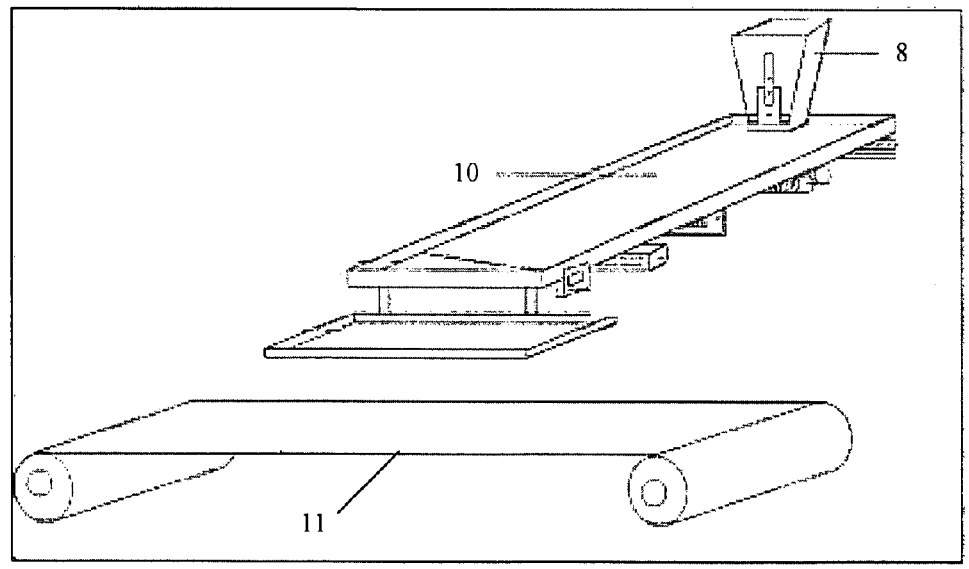
FIGS. 1C and 1D are schematic illustrations of a system for obtaining labels according to a first embodiment of the invention, respectively in the resting step and during its operation.
Figure 1D:
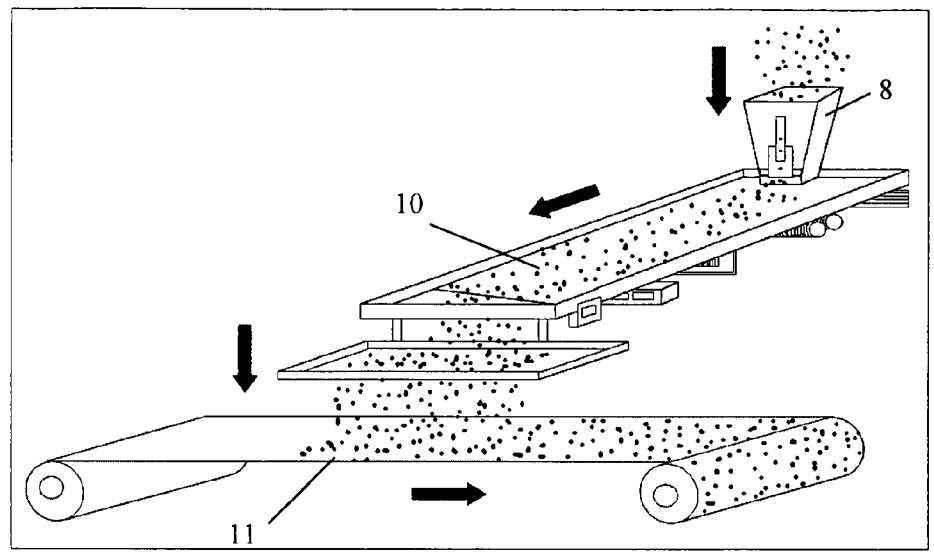

In the next step, said particles are introduced into a hopper 8 (FIG. 1C), which, by means of a surface with vibrating screen 10, distributes and sprinkles them (FIGS. 1C, 1D), on a glossy transparent polypropylene sheet 11 having a thickness of approximately 0.25 to 200 μm, during or after spreading with glue thereof to render it adhesive.

The particles mixed with glue or spread on the glue distribute randomly with differentiated positions of orientation over the entire area rendered adhesive of the polypropylene sheet 11, which is glued on a transparent supporting sheet 14 preferably made of polyvinyl.

Figure 2A:
FIGS. 2A and 2B show the step of delimitation of a background map that is defined not only by the random location of each individual particle but also by the variant of reading and position of the logo and by the dimensions of the circumscribed area considered.

On the back of the polyvinyl sheet, precisely on account its transparency, the particles differently positioned that are fixed by the glue will stand out (FIG. 2A).

Figure 2B:
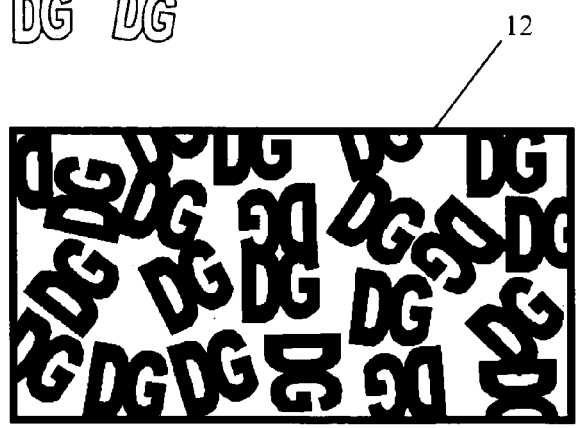

These particles, when circumscribed by being printed in a given space, will create a background map 12 deriving not only from the random location of each individual particle, but also from the variability of reading and position of the logo (FIG. 2B).

The base sheet 14 may be made of plastic material or mono-adhesive or bi-adhesive paper, having a different thickness according to the requirements of application of the label to the product.

In the next step, reading is performed of the unique sign created by the individual diversity of the background map 12 of each label (FIG. 3).

The sign is detected with an optical detection device such as an optical-digital photographic camera (or telecamera) 16, and then translated and processed via a suitable software program, and finally stored in a filing database for a possible retrieval for checking purposes.

According to the invention, the originality of each unique label 6 applied on the product 20 and distributed in commercial channels can thus at any moment be checked in real time even remotely, by photographing the unique background data with a suitable optical detection device or with a normal mobile-telephone apparatus 22 provided with photographic camera, possibly sending the logo or sign detected even via MMS or the Internet.

The sign thus sent can be compared with the one originally stored or filed previously in the database 18, giving the response of authenticity almost immediately for a total guarantee of originality of the product 20.

As an alternative to the method just described, use is envisaged, for the production of the unique label 6a, of a transparent PVC sheet 24 having a thickness of approximately 0.25-200 μm (FIG. 4) and application thereon of a bi-adhesive polyvinyl sheet 26, spread on one side of which is an acrylic glue of a neutral colour in aqueous solution containing approximately from 4 to 70% of the particles previously obtained from a black polyester sheet as described above or else of other holographic particles, the larger size of which is approximately 10-3000 μm (FIG. 4).

The PVC sheet hence exerts the fundamental function of anchorage for future application as transparent self-adhesive label on the product with the possibility of printing additional and personalizing data on the back (FIG. 3C).

The dispersion and random distribution of the various black or else holographic particles in the glue are brought out, through the transparency of the PVC sheet, given that the particles, by being circumscribed and positioned via a printed sign, form a background map for each square centimeter.

In this way, a unique sign is provided, which can be determined by an optical detection device and can be sent to a centralized filing database with the same modalities described in the previous case.

From what has been said so far, it is evident that the present invention does not constitute a mere label, but a label providing assurance of originality with an intrinsic sign that constitutes its "fingerprint" filed originally for a future comparison of authenticity so providing a guarantee of the product on which it is applied and is characterized in that it can be read and compared by the purchaser of the product instantaneously in remote mode with the use of an optical device, such as, for example, a mobile-telephone apparatus, for an immediate check on originality.

Obviously, many details of the invention regarding the method of production and the technique of collection of the images may vary, without this implying any departure from the scope of the invention as defined by the ensuing claims.

EXAMPLE

Purely by way of non-limiting indication, there now follows a detailed description of the example of embodiment of a self-adhesive polypropylene label characterized by the logo of the manufacturer and bearing a unique sign for a possible check on originality.

A polypropylene sheet with a thickness of 10 μm is colour printed with an aligned series with repetitive position of the manufacturer's logo, the larger size of which is 3000 μm. After printing, an edge-sign dinking is performed of each individual logo, to create an infinite series of individual particles each characterized by the evident presence of the logo. In the next step, the personalized particles with the logo are introduced into a hopper, which feeds a vibrating table, which, via a screen of variable mesh and variable vibration, distributes and sprinkles a 4% mixture of said particles in acrylic glue, onto a bi-adhesive polypropylene sheet having a thickness of 25 μm. The particles anchor to the glue and randomly distribute over the entire area of the sheet with differentiated positions of orientation. The sheet with the particles on top is then coupled to a transparent polyvinyl substrate having a thickness of 20 μm, and printed on the back is a given circumscribed space of 0.5 cm² to create a background map deriving from the random location of each individual particle but also from the variability of reading and position of the logo. The next step is performed by a master system for reading the circumscribed unique datum created by the individual diversity of the background map of each label, which enables storage of its characteristics of univocality in a compact format. The background map is detected optically with a digital, preferably high-resolution, telecamera, which frames the circumscribed datum in pre-set geometrical and lighting conditions and extracts the co-ordinates and the dimensions of each particle. The data are associated to a unique read code (datamatrix) and stored in a database for subsequent verification.

The invention claimed is:

1. A method of using a univocal label for verifying the originality of a product provided with said univocal label, said method comprising the steps of:
    a) providing said univocal label on said product, said univocal label comprising:
        a sheet having a thickness of approximately 2-30 μm;
        characterizing signs applied to said sheet in repetitive and variable series and dinked to said sheet to obtain particles, said particles being different sizes ranging from 10 to 4000 μm;
        a base sheet with said particles randomly distributed via dispersion in a single layer on said base sheet; and
        a transparent sheet, said particles and said base sheet being coupled to said transparent sheet so that said particles remain inserted between a printed side and a side rendered adhesive;
        wherein said transparent sheet comprising a sign printed on said transparent sheet that circumscribes said particles within a space of approximately 0.50-2.5 cm² thus creating a map with a univocal background pattern;
    b) detecting said map of said univocal label via an optical acquisition device;
    c) analyzing, processing and filing said map in a central filing data bank; and
    d) verifying and checking optically the originality of said product on which said univocal label is applied at any moment of a life of said product after production by accessing said data bank for comparing an image of said univocal label on said product to be checked, with a corresponding image stored in said data bank.

2. The method according to claim 1, wherein said image of said univocal label of said product is detected with an optical acquisition device and sent to said data bank to be compared with said map filed in said data bank.

3. The method according to claim 2, wherein said image is sent to said data bank via a system from one of MMS, and internet.

4. The method according to claim 2, said image of said univocal label of said product is verified and optically checked via a photographic camera of a cell phone.

5. The method according to claim 1, wherein said base sheet being selected from the group consisting of a mono-adhesive sheet, and a bi-adhesive sheet.

6. The method according to claim 1, wherein said transparent sheet being selected from the group consisting of a PVC-based sheet, a polyvinyl-based sheet, and a polypropylene-based sheet.

7. The method according to claim 1, wherein said particles are pretreated with a glue.

8. The method according to claim 1, wherein said particles are spread on said transparent sheet with a mixture containing approximately 4-80% of said particles in a glue.

9. The method according to claim 1, wherein said particles are sprayed on a glue with an industrial aerograph to form a substrate.

10. The method according to claim 1, wherein said particles are laid on said transparent sheet to form a substrate.

11. The method according to claim 1, wherein said characterizing signs are selected from the group consisting of a barcode, a datamatric, an alphanumeric data, and a manufacturer logo.

12. The method according to claim 1, wherein said particles are selected from the group consisting of a holograph particle, and a printed particle.

13. The method according to claim 1, wherein said particles having a characteristic selected from the group consisting of color, pattern, and shape.

14. The method according to claim 1, wherein said particles are black in color.

\* \* \* \* \*